United States Patent
Maljaars

(10) Patent No.: US 7,891,316 B1
(45) Date of Patent: Feb. 22, 2011

(54) REAR MILKING CLUSTER HOSE SUPPORT ARM AND ASSOCIATED METHOD

(76) Inventor: Pete Maljaars, 3206-6 Avenue North, Lethbridge, Alberta (CA) T1H 5C3

( * ) Notice: Subject to any disclaimer, the term of this patent is extended or adjusted under 35 U.S.C. 154(b) by 370 days.

(21) Appl. No.: 12/150,783

(22) Filed: May 1, 2008

(51) Int. Cl.
*A01J 3/00* (2006.01)
*A01J 5/00* (2006.01)

(52) U.S. Cl. ............... 119/14.1; 119/14.13; 119/14.45; 248/75; 248/51; 248/298.1

(58) Field of Classification Search ............... 119/14.1, 119/14.13, 14.45, 14.12, 14.11, 14.05, 14.18; 248/75, 51, 298.1
See application file for complete search history.

(56) References Cited

U.S. PATENT DOCUMENTS

| | | | |
|---|---|---|---|
| 1,249,345 A * | 12/1917 | Davidson | 119/14.1 |
| 2,775,224 A * | 12/1956 | Rawson et al. | 119/14.13 |
| 2,869,512 A * | 1/1959 | Merritt et al. | 119/14.46 |
| 3,033,161 A * | 5/1962 | Babson | 119/14.13 |
| 3,251,570 A | 5/1966 | Frost | |
| 3,605,695 A * | 9/1971 | Thomas et al. | 119/14.1 |
| 3,962,575 A | 6/1976 | Vandenberg, Jr. | |
| 3,999,518 A * | 12/1976 | Needham et al. | 119/14.13 |
| 4,188,910 A | 2/1980 | Hocker | |
| 4,228,763 A | 10/1980 | Heidecker et al. | |
| 4,228,764 A | 10/1980 | Plett | |
| 4,333,421 A | 6/1982 | Schluckbier | |
| 4,491,085 A | 1/1985 | Rubino | |
| 4,586,462 A | 5/1986 | Icking | |
| 4,805,559 A * | 2/1989 | Van der Lely et al. | 119/14.1 |
| 5,069,159 A | 12/1991 | Peacock | |
| 5,960,738 A | 10/1999 | Sanford | |
| 6,240,878 B1 * | 6/2001 | Larson et al. | 119/14.08 |
| 6,289,945 B1 | 9/2001 | Haboush | |
| 6,382,130 B1 | 5/2002 | Rooney | |
| 2004/0040512 A1 * | 3/2004 | Hayne | 119/14.54 |
| 2009/0165727 A1 * | 7/2009 | Petterson et al. | 119/14.03 |

* cited by examiner

*Primary Examiner*—Timothy D Collins
*Assistant Examiner*—Joshua Huson

(57) ABSTRACT

A rear milking cluster hose support arm for supporting a milking cluster hose in an existing milking system where milking is done from a rear of a cow includes a rubber bumper for supporting an existing cluster hose and a rectilinear rod. The apparatus further includes a rod holder and a selectively adjusting mechanism with a coupling nut, an air hose, a tee union adapter, and a flattened lever. A predetermined oscillating air pressure level is introduced into the cylinder from the existing air supply source to thereby raise and lower the coupling nut and articulate the lever about the rod to thereby adjust the position of the rod and the rubber bumper respectively during non-operating conditions.

9 Claims, 8 Drawing Sheets

REAR MILKING CLUSTER HOSE SUPPORT ARM AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to milking cluster hose support arms and, more particularly, to a rear milking cluster hose support arm and associated method for supporting a milking cluster hose in an existing milking system where the milking is done from a rear of a cow.

2. Prior Art

U.S. Pat. No. 3,962,575 to Vandenberg et al. discloses a downwardly extending radial arm having a hook-shaped end portion for engaging milk hoses. The invention is secured to a generally horizontal cow stall mounting rail by a self-lubricating ball and socket joint. The ball is secured to the mounting rail by a diametrically extending bolt either received through the mounting rail or through a sleeve around the rail. The socket member is formed of separable halves which upwardly clamp the ball and downwardly clamp an upper end of the support arm by a clamping bolt extending through the socket member halves. Unfortunately, this prior art example is not designed to address the specific needs associated with milking systems performed from the rear of a cow.

U.S. Pat. No. 4,491,085 to Rubino discloses a support structure for an arm adjustably supporting a hose at a stall of a cow milking system. The structure includes a leg carried by a ball and having a tubular section within which the arm may be adjustably secured. The ball is received in a bracket which permits universal rotation with respect to the stall. The bracket frictionally secures the ball in whatever position it is placed. The arm may be moved manually or may be moved automatically by a retractor cylinder activated upon the completion of milking. Unfortunately, this prior art example is not designed to address the specific needs associated with milking systems performed from the rear of a cow.

U.S. Pat. No. 5,069,159 to Peacock discloses a device for supporting a milking hose during milking operations, comprised of a base, a first arm connected at one end to the base by a first friction pivot permitting the arm to rotate about a first axis, and a knuckle connected to the other end of the first arm. The knuckle, formed from a pair of pivots interconnected at right angles, supports a second arm having a fork at its upper end for supporting the milking hose. The position of the fork can be adjusted in at least two directions with respect to the base. Unfortunately, this prior art example does not provide an arm that may be adjusted according to the varying needs associated with the size of the cow being milked.

Accordingly the rear milking cluster hose support arm is disclosed in order to overcome the above noted shortcomings. The present invention satisfies such a need by providing an apparatus that is convenient and easy to use, lightweight yet durable in design, and supports a milking cluster hose in an existing milking system where the milking is done from a rear of a cow. The rear milking cluster hose support arm properly aligns the milking cluster on the cow in order to promote more even milkout and to reduce accidental air admission into the cluster. The present invention is simple to use, inexpensive, and designed for many years of repeated use.

BRIEF SUMMARY OF THE INVENTION

In view of the foregoing background, it is therefore an object of the present invention to provide an apparatus for supporting a milking cluster hose in an existing milking system where the milking is done from a rear of a cow. These and other objects, features, and advantages of the invention are provided by a rear milking cluster hose support arm.

A rear milking cluster hose support arm for supporting a milking cluster hose in an existing milking system where milking is done from a rear of a cow includes a rubber bumper for decreasing noise and wear when an air cylinder releases the lever and a rod (described hereinafter) drops down below the curb. A rectilinear rod has a first end directly attached to the rubber bumper and further with a second end extending vertically and downwardly away from the rubber bumper. Such a rod has a plurality of monolithically formed planar outer surfaces.

The support arm further includes a rod holder directly connected to the rod and telescopically adjusted along a major longitudinal length thereof. Such a rod holder advantageously has a plurality of vertically aligned apertures formed in the upper and lower portions respectively. Such apertures are sized and shaped such that the rod is telescopically interfitted within the apertures during operating conditions. Each of the apertures conveniently has a centrally registered and vertically oriented axis positioned in such a manner that the rod simultaneously penetrates each of the apertures when the rod is interfitted within the rod holder. The rod holder further has a vertically oriented slot formed in a middle portion thereof.

The support arm further includes a mechanism for selectively adjusting the rod along a first bi-directional linear path when an existing air pinch valve of an existing milking system is activated such that the rod drops below an existing curb. Such a selectively adjusting mechanism is directly engaged with the rod and the rod holder during operating conditions. The selectively adjusting mechanism effectively includes a cylinder with a distal end directly coupled to a bottom surface of the lower portion of the rod holder. Such a cylinder advantageously has a proximal end extending downwardly and away from the distal end of the cylinder. The distal end of the cylinder is conveniently spaced from the middle portion of the rod holder and the rod respectively when the rod is interfitted within the rod holder. The cylinder further has a longitudinal length oriented parallel to the longitudinal length of the rod during operating conditions such that a drive cam of the cylinder travels along a second bi-directional linear path defined parallel to the first bi-directional linear path. The air cylinder is activated by the same air solenoid that supplies the pinch valve.

The selectively adjusting mechanism further includes a coupling nut threadably coupled to the distal end of the cylinder. Such a coupling nut is effectively abutted against a top surface of the lower portion of the rod holder in such a manner that the lower portion of the rod holder is statically held between the coupling nut and the distal end of the cylinder during operating conditions. The selectively adjusting mechanism further includes an air hose with a first end directly connected to the proximal end of the cylinder and a second end extending away therefrom, and a tee union adapter directly connected to the second end of the air hose. Such a tee union adapter advantageously connects the air hose to an existing air supply source.

The selectively adjusting mechanism further includes a flattened lever with axially opposed left and right ends. The lever is the most important part of the present invention for holding the rod at the desired height. The lever engages the rod in a combination of friction and gravity to hold the rod at the desired height. The lever engages on its own and can be released either manually or by admitting pressured air into the air cylinder. Such a left end of the lever conveniently has a top surface oriented along a vertical plane while a medial portion of the lever and such a right end of the lever has respective top surfaces oriented along a horizontal plane. The left end of the lever is interfitted within the slot of the middle portion of the rod holder. Such a middle portion of the lever effectively has an opening formed therein. Such an opening is vertically aligned with the apertures of the rod holder and is positioned in such a manner that the rod simultaneously penetrates the opening and the apertures respectively when the rod is interfitted within the rod holder during operating conditions. The right end of the lever has a lower surface spaced from the coupling nut during operating conditions.

A predetermined oscillating air pressure level is introduced into the cylinder from the existing air supply source to thereby raise and lower the coupling nut and articulate the lever about the rod to thereby adjust the position of the rod and the rubber bumper respectively during non-operating conditions. It is noted that the air cylinder does not have any air pressure to it at the time of operating the hose support arm, and the air cylinder and coupling nut must not contact the underside of the lever during operation. The coupling nut adjusts the length of the cylinder rod so that it will lift the lever when engaged but will be free of all contact with the lever when the hose arm rod is to be adjusted to the correct position. Therefore, no contact is made between the lever and cylinder during operating conditions.

The cluster hose support arm further includes a portable slide with a longitudinal length oriented along a horizontal plane and with front and back sides respectively. Such a slide conveniently has top and bottom edges registered parallel to the longitudinal length of the slide. Such top and bottom edges are effectively folded upwardly and inwardly towards the front side of the slide respectively and terminate proximal of a centrally registered axis of the slide. Such folds of the top and bottom edges define a groove therein.

A planar back plate has a lateral width that is less than a lateral width of the slide and further has top and bottom surfaces respectively. Such a back plate is slidably interfitted with the slide such that the back plate is linearly positioned along the entire longitudinal length of the slide as desired by the user during operating conditions. The bottom surface of the back plate is effectively abutted directly against the front side of the slide. The top surface of the back plate is monolithically formed with the rod holder such that the top surface of the back plate is registered perpendicular to the respective longitudinal lengths of the rod and the cylinder.

An alternate embodiment of the cluster hose support arm further includes a substantially square-shaped and planar back plate with front and back sides respectively. Such a back plate is conveniently provided with one wall monolithically formed therewith and located along an outer edge of the back plate and further is oriented at a right angle to the back plate. The front side of the back plate is monolithically formed with the rod holder such that the front side of the back plate is registered perpendicular to the respective longitudinal lengths of the rod and the cylinder. The rod holder is located subjacent to and opposite of the one wall.

A substantially C-shaped angle bracket has upper, middle, and lower portions respectively. Such an upper portion is advantageously directly attached to the one wall. The upper, middle, and lower portions are collectively located subjacent to the one wall when the angle bracket is attached to the one wall. Such an angle bracket is positioned in such a manner that an interior surface of the angle bracket faces toward the back side of the back plate and thereby forms a passageway extending along entire longitudinal lengths of the angle bracket and the one wall respectively. Such a passageway has an open face oriented downwardly and away from the one wall during operating conditions.

A method for supporting an existing milking cluster hose where milking is done from a rear of a cow includes the steps of: providing a rubber bumper for supporting an existing cluster hose therealong and directly attaching a first end of a rectilinear rod to the rubber bumper. Such a rectilinear rod has a second end extending vertically and downwardly away from the rubber bumper. The steps further include directly connecting a rod holder to the rod in such a manner that the rod is telescopically adjusted along a major longitudinal length thereof and selectively adjusting the rod along a first bi-directional linear path when an existing air pinch valve of existing milking system is activated such that the rod drops below an existing curb.

The method further includes the step of directly coupling a distal end of a cylinder to a bottom surface of the lower portion of the rod holder. Such a cylinder has a proximal end extending downwardly and away from the distal end of the cylinder. Such a distal end of the cylinder is spaced from a middle portion of the rod holder and the rod respectively when the rod is interfitted within the rod holder. The cylinder has a longitudinal length oriented parallel to the longitudinal length of the rod during operating conditions such that a drive cam of the cylinder travels along a second bi-directional linear path defined parallel to the first bi-directional linear path.

The method further includes the step of threadably attaching a coupling nut to the distal end of the cylinder. Such a coupling nut is abutted against a top surface of the lower portion of the rod holder in such a manner that the lower portion of the rod holder is statically held between the coupling nut and the distal end of the cylinder during operating conditions. The steps further include: directly connecting a first end of an air hose to the proximal end of the cylinder and a second end extending away therefrom; directly connecting a tee union adapter to the second end of the air hose, the tee union adapter connecting the air hose to an existing air supply source; and connecting a flattened lever to the rod holder. The lever is the most important part of the present invention for holding the rod at the desired height. The lever engages the rod in a combination of friction and gravity to hold the rod at the desired height. The lever engages on its own and can be released either manually or by admitting pressured air into the air cylinder.

Such a lever has axially opposed left and right ends. The left end of the lever has a top surface oriented along a vertical plane while a medial portion of the lever and the right end of the lever have respective top surfaces oriented along a horizontal plane. The left end of the lever is interfitted within the slot of the middle portion of the rod holder, and the medial portion of the lever has an opening formed therein. Such an opening is vertically aligned with the apertures of the rod holder and is positioned in such a manner that the rod simultaneously penetrates the opening and the apertures respectively when the rod is interfitted within the rod holder during operating conditions. The right end of the lever has a lower surface spaced from the coupling nut during operating conditions. Another step includes introducing a predetermined oscillating air pressure level into the cylinder from the existing air supply source and thereby raising and lowering the coupling nut and articulating the lever about the rod to adjust the position of the rod and the rubber bumper respectively during non-operating conditions. It is noted that the air cylinder does not have any air pressure to it at the time of operating the hose support arm, and the air cylinder and coupling nut must not contact the underside of the lever during operation. The coupling nut adjusts the length of the cylinder rod so that it will lift the lever when engaged but will be free of all contact with the lever when the hose arm rod is to be adjusted to the correct position. Therefore, no contact is made between the lever and cylinder during operating conditions.

The method further includes the step of providing a portable slide with a longitudinal length oriented along a horizontal plane and further has front and back sides respectively. Such a slide has top and bottom edges registered parallel to the longitudinal length of the slide. Such top and bottom edges are folded upwardly and inwardly towards the front side of the slide respectively and terminate proximal of a centrally registered axis of the slide. Such folds of the top and bottom edges define a groove therein.

The steps further include providing a planar back plate with a lateral width that is less than a lateral width of the slide and further has top and bottom surfaces respectively. Such a back plate is slidably interfitted with the slide such that the back plate is linearly positional along the entire longitudinal length of the slide as desired by the user during operating conditions. The bottom surface of the back plate is abutted directly against the front side of the slide. The top surface of the back plate is monolithically formed with the rod holder such that the top surface of the back plate is registered perpendicular to the respective longitudinal lengths of the rod and the cylinder.

In an alternate embodiment of the support arm, the method further includes the step of providing a substantially square-shaped and planar back plate with front and back sides respectively. Such a back plate is provided with one wall monolithically formed therewith and located along an outer edge of the back plate and further is oriented at a right angle to the back plate. The front side of the back plate is monolithically formed with the rod holder such that the front side of the back plate is registered perpendicular to the respective longitudinal lengths of the rod and the cylinder. The rod holder is located subjacent to and opposite of the one wall.

The method for an alternate embodiment of the present invention further includes the step of providing a substantially C-shaped angle bracket with upper, middle, and lower portions respectively. Such an upper portion is directly attached to the one wall. The upper, middle, and lower portions are collectively located subjacent to the one wall when the angle bracket is attached to the one wall. Such an angle bracket is positioned in such a manner that an interior surface of the angle bracket faces toward the back side of the back plate and thereby forms a passageway extending along entire longitudinal lengths of the angle bracket and the one wall respectively. Such a passageway has an open face oriented downwardly and away from the one wall during operating conditions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
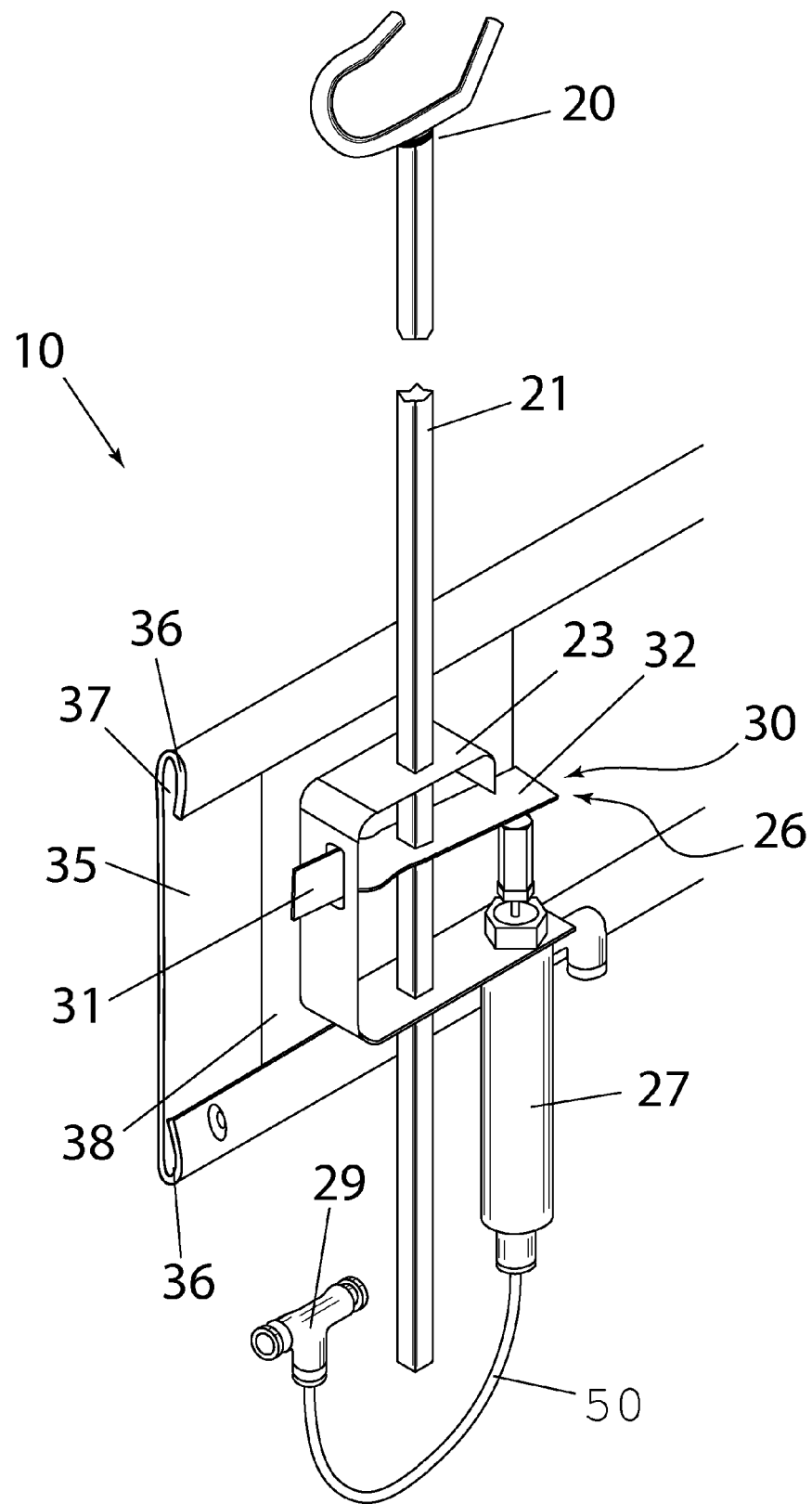
FIG. 1 is a perspective view of the rear milking cluster hose support arm, in accordance with the present invention.
Figure 2:
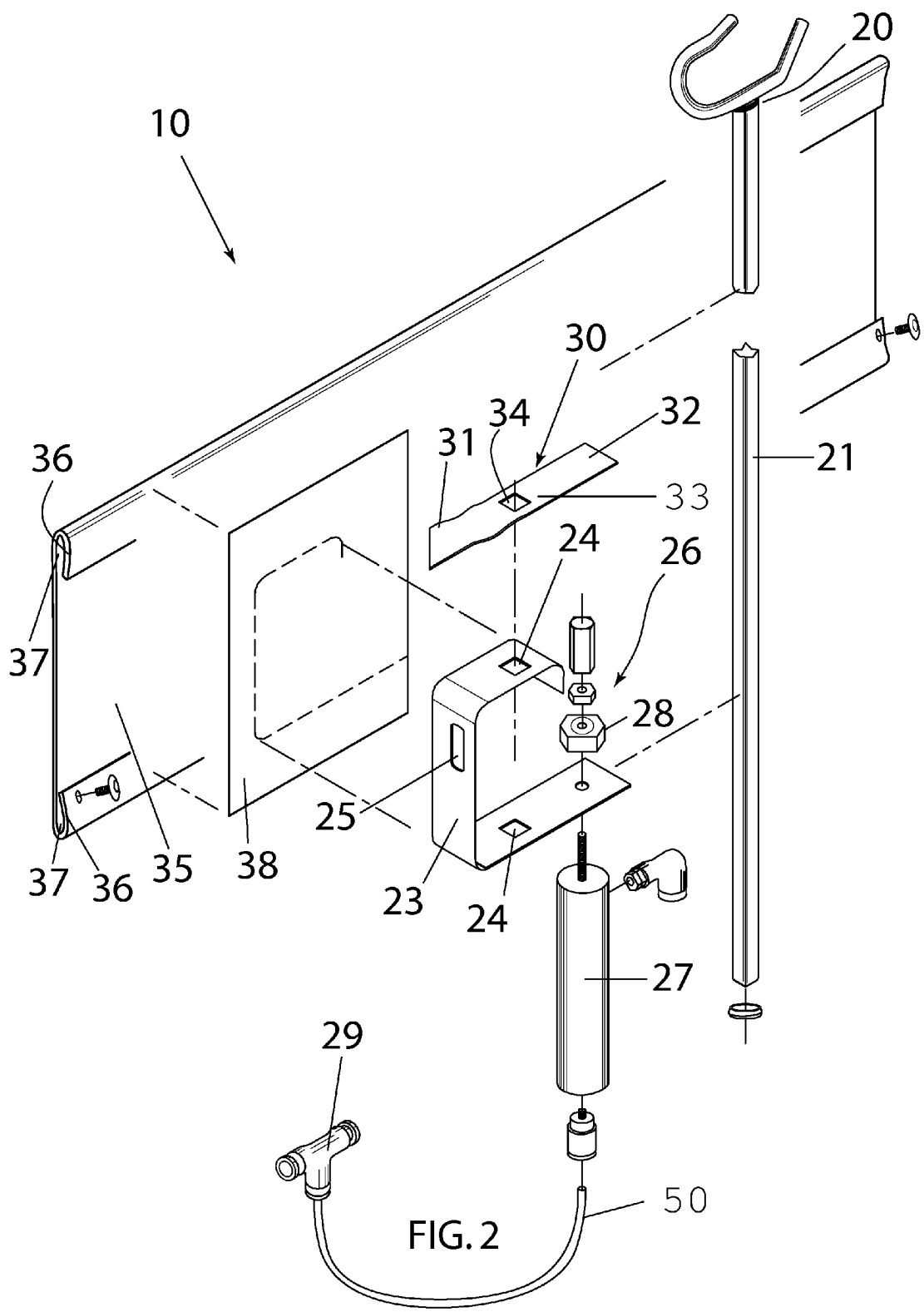
FIG. 2 is an exploded view of the rear milking cluster hose support arm, in accordance with the present invention.
Figure 3:
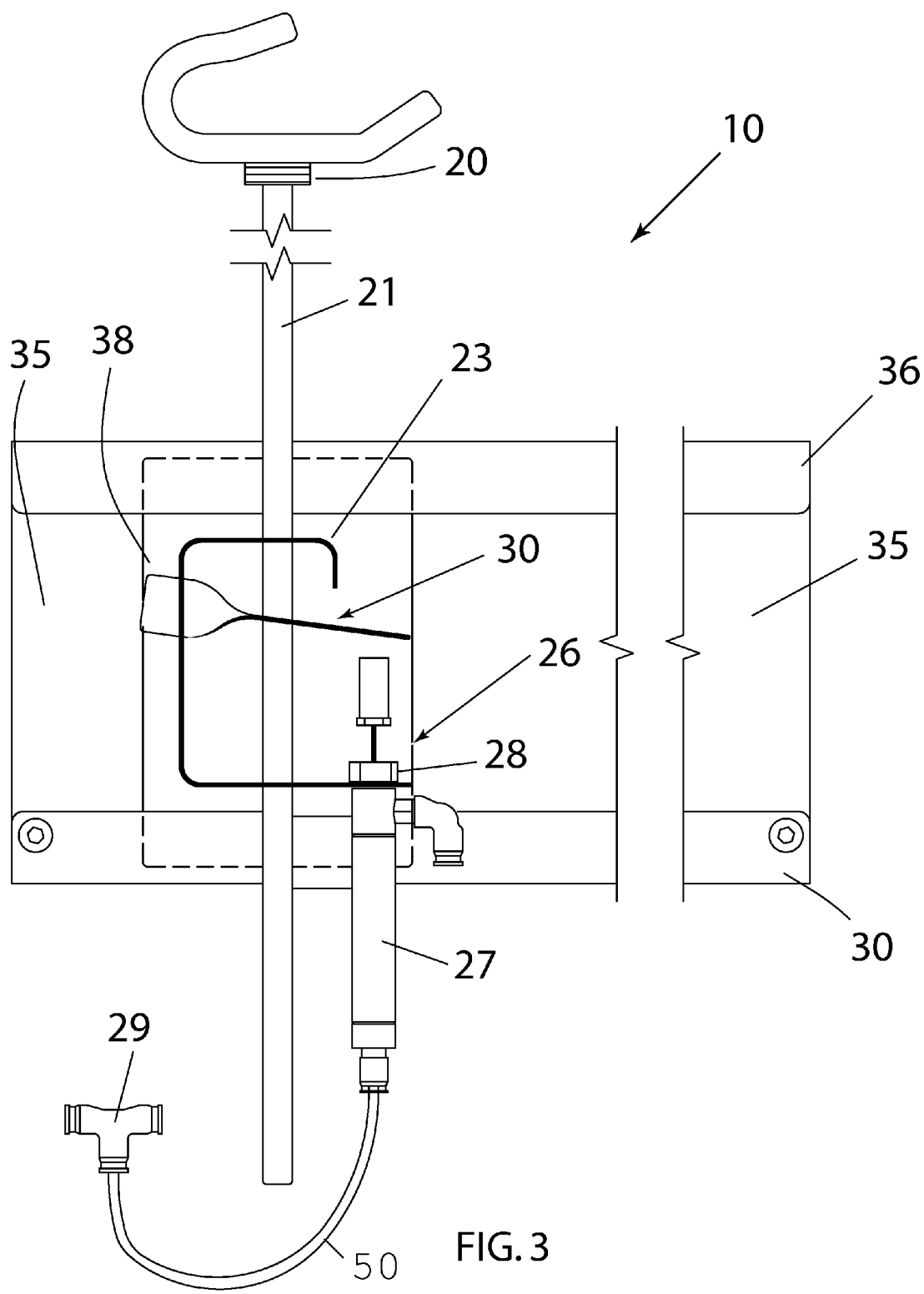
FIG. 3 is a front elevational view of the rear milking cluster hose support arm, in accordance with the present invention.
Figure 4:
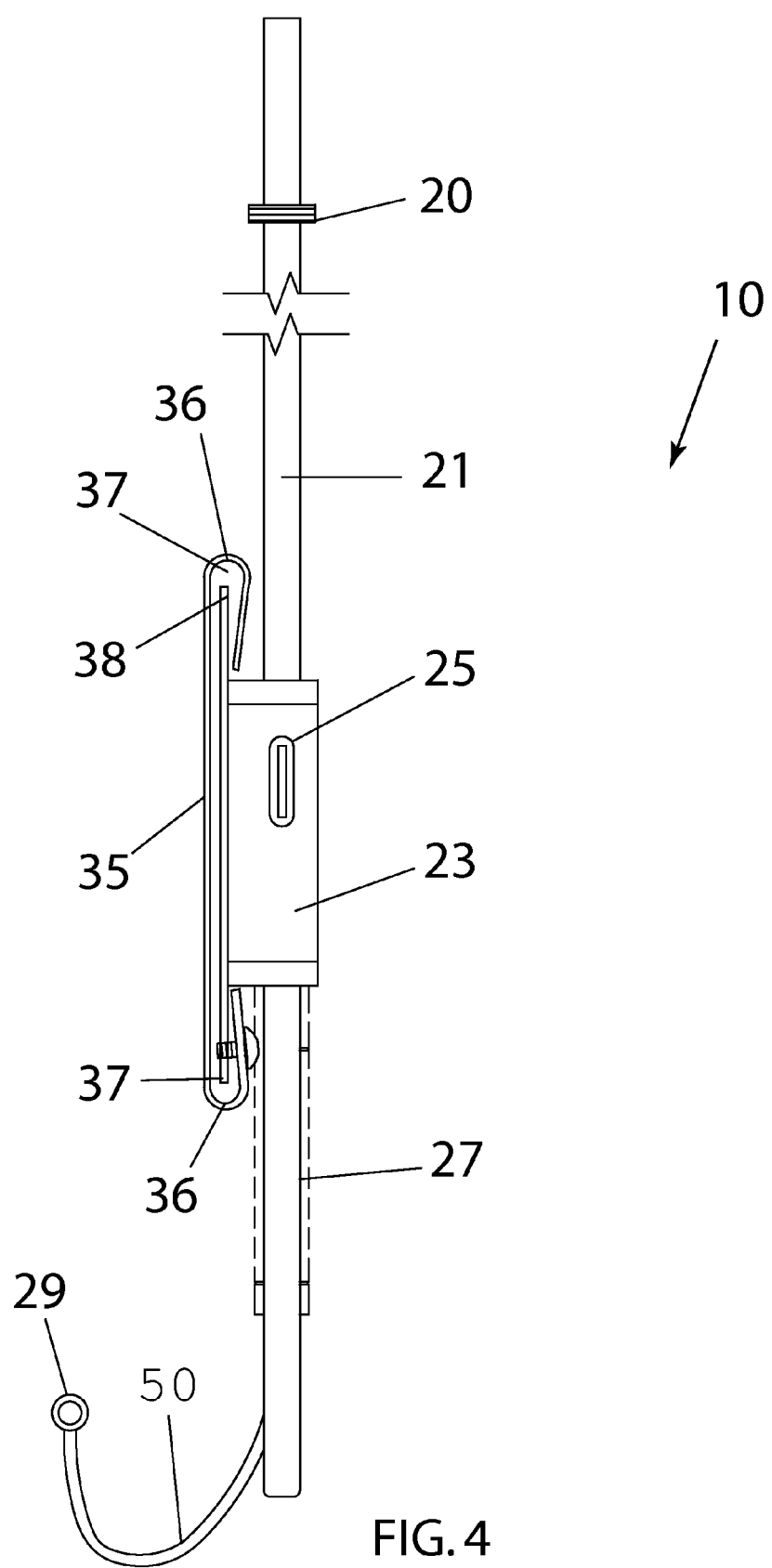
FIG. 4 is a side elevational view of the rear milking cluster hose support arm, in accordance with the present invention.
Figure 5:
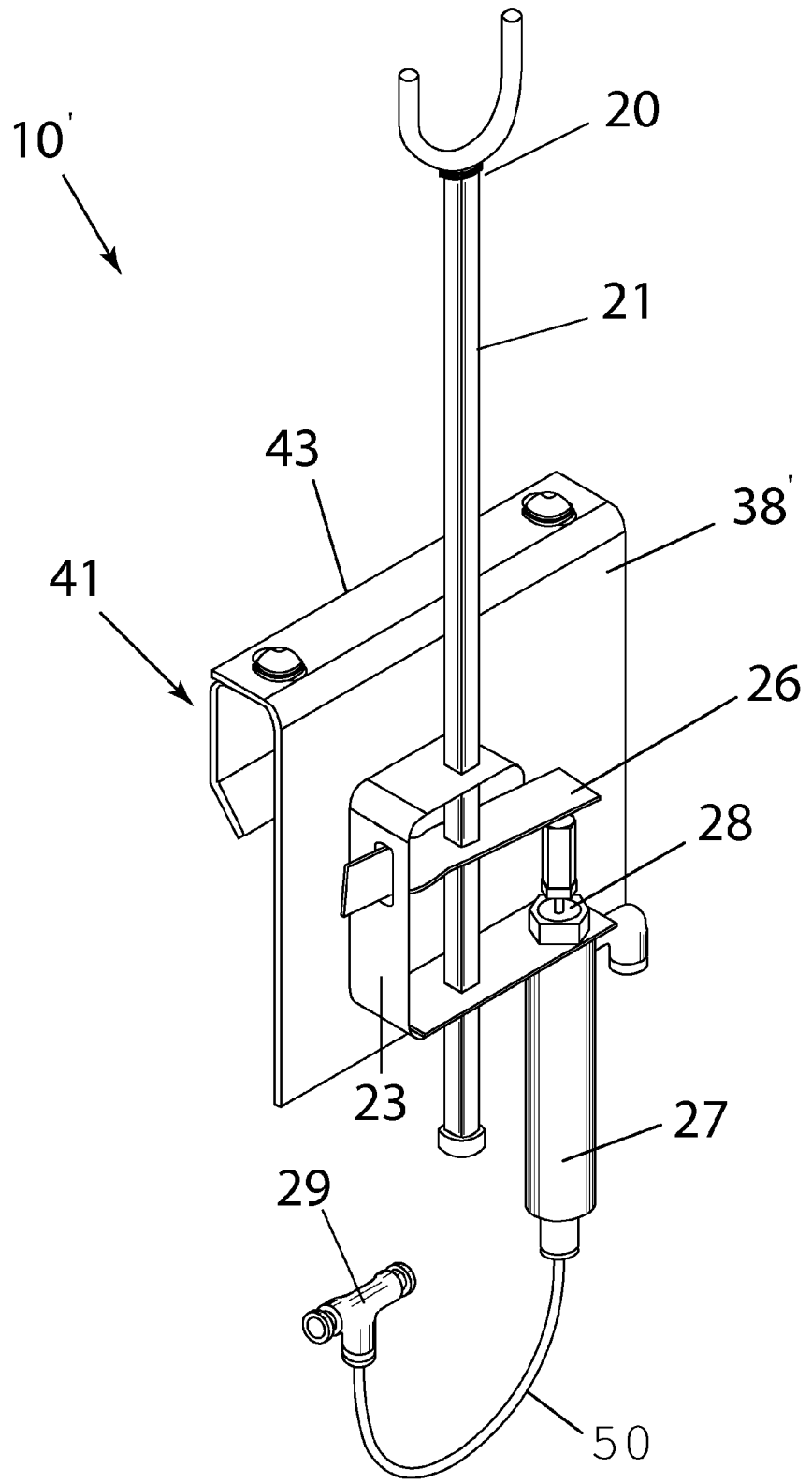
FIG. 5 is a perspective view of an alternate embodiment of a rear milking cluster hose support arm, in accordance with the present invention.
Figure 6:
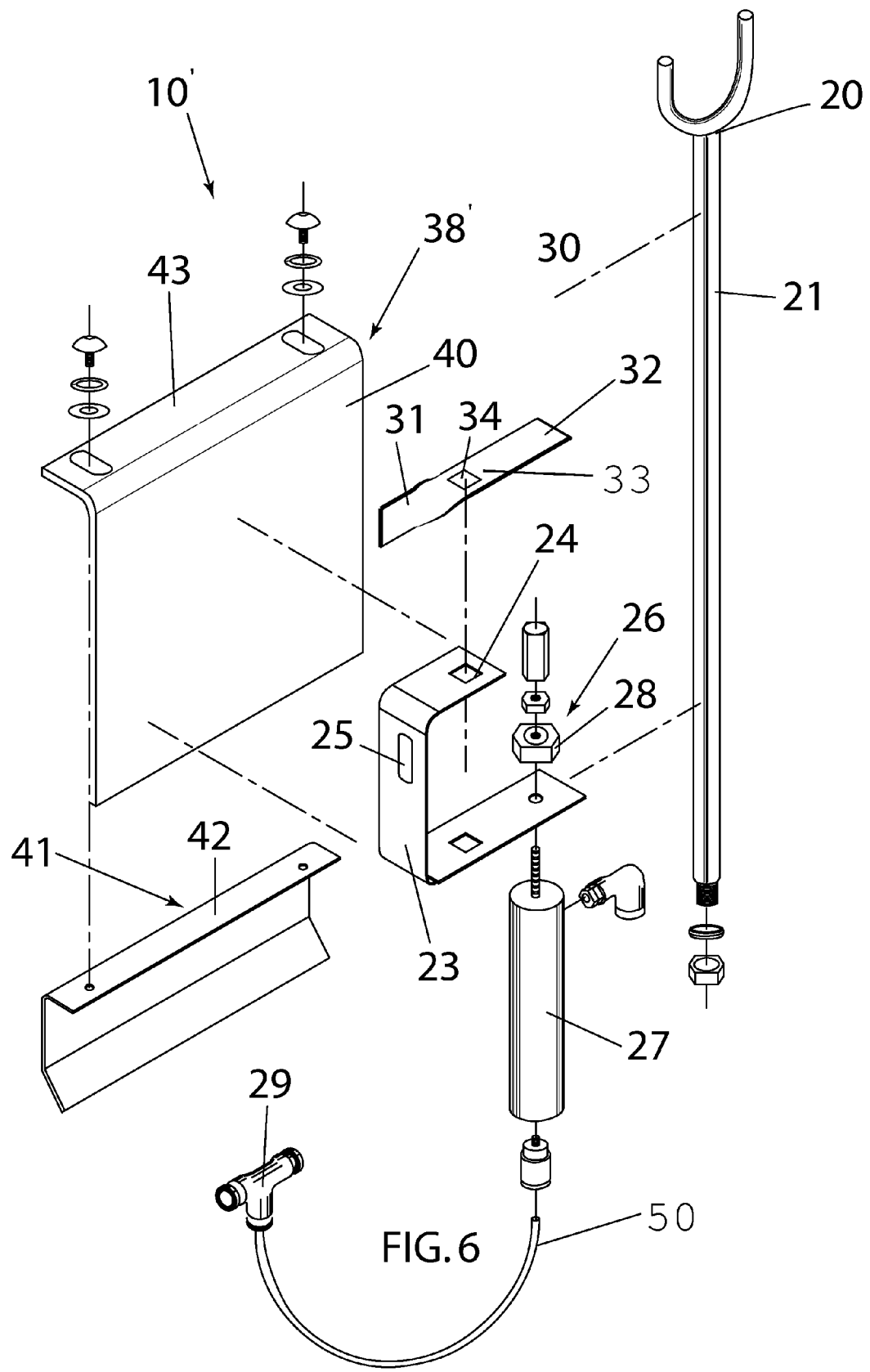
FIG. 6 is an exploded view of an alternate embodiment of a rear milking cluster hose support arm, in accordance with the present invention.
Figure 7:
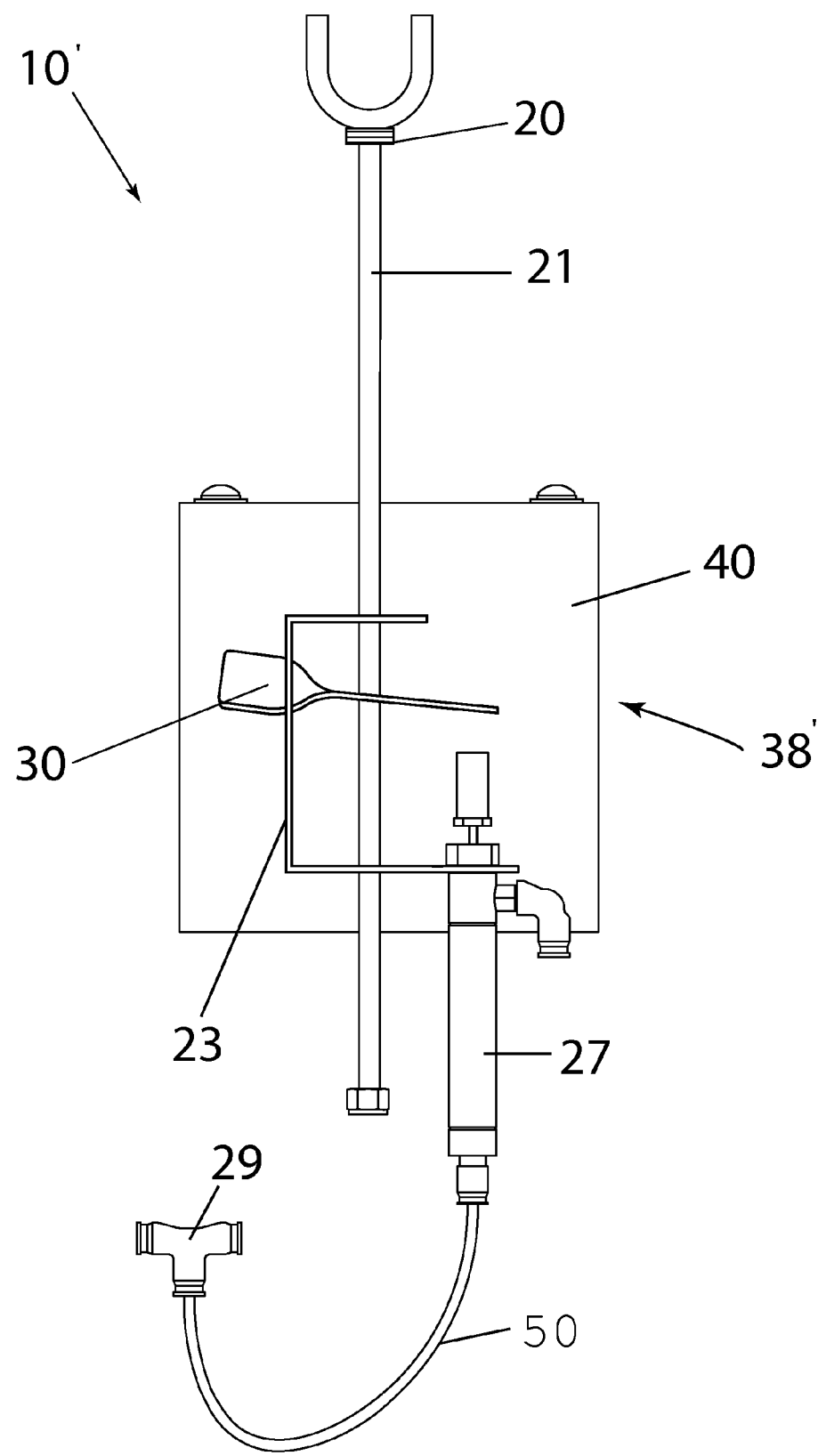
FIG. 7 is a front elevational view of an alternate embodiment of a rear milking cluster hose support arm, in accordance with the present invention.
Figure 8:
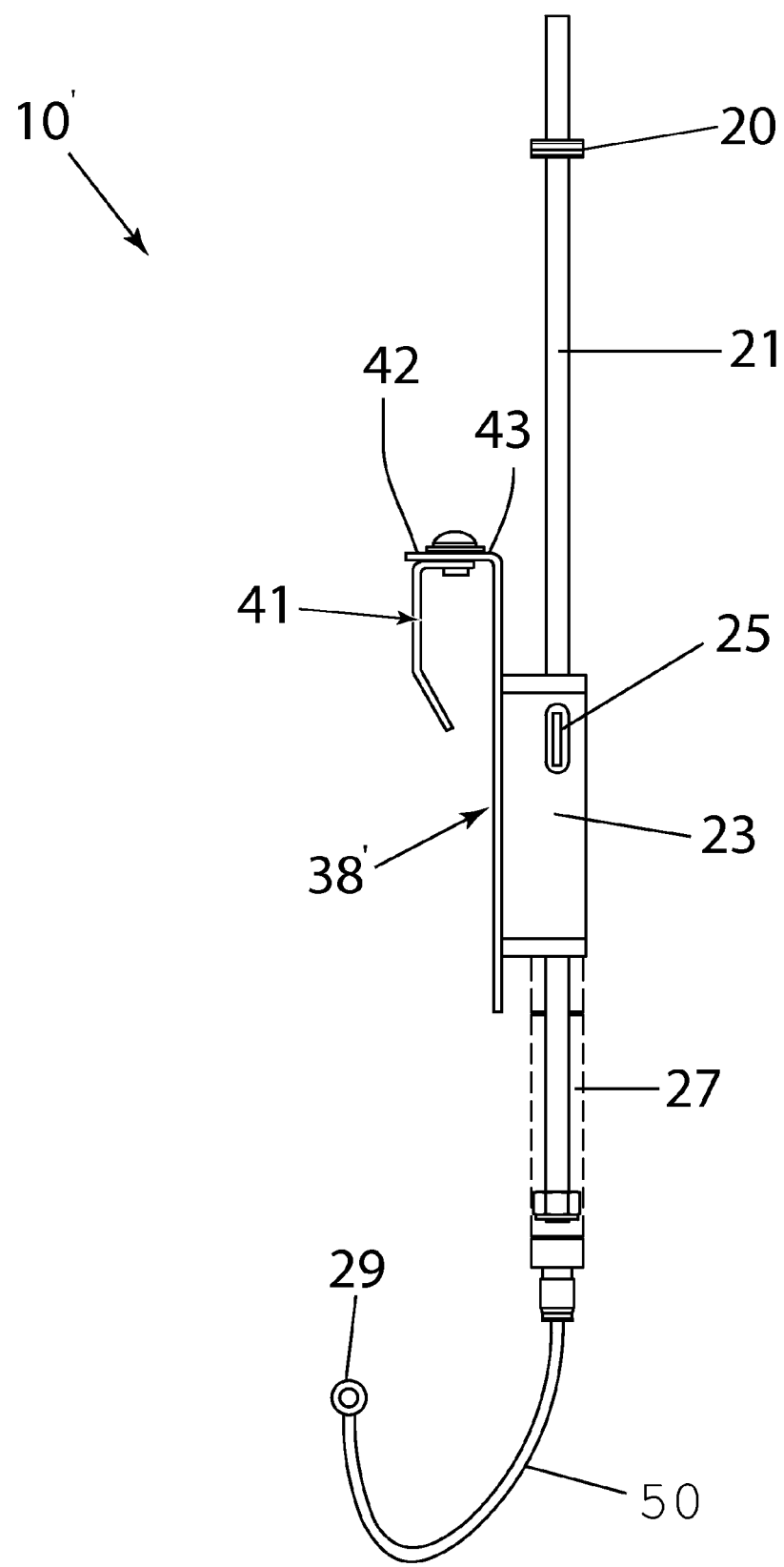
FIG. 8 is a side elevational view of an alternate embodiment of a rear milking cluster hose support arm, in accordance with the present invention.

The apparatus of this invention is referred to generally in FIGS. 1-8 by the reference numeral 10, with an alternate embodiment 10', and is intended to provide a rear milking cluster hose support arm. It should be understood that the apparatuses 10 and 10' may be used to support many different types of hoses and should not be limited to supporting only those hoses mentioned herein.

Referring initially to FIGS. 1-8, a rear milking cluster hose support arm for supporting a milking cluster hose in an existing milking system where milking is done from a rear of a cow includes a rubber bumper 20 for decreasing noise and wear when an air cylinder releases the lever and a rod (described hereinafter) drops down below the curb. A rectilinear rod 21 has a first end directly attached to the rubber bumper 20 and further with a second end extending vertically and downwardly away from the rubber bumper 20. Such a rod 21 conveniently has a plurality of monolithically formed planar outer surfaces. The rod provides a user the advantage of changing the height of the apparatus according to the height of the cow.

Referring again to FIGS. 1-8, the selectively adjusting mechanism further includes a coupling nut 28 threadably coupled to the distal end of the cylinder 27. Such a coupling nut 28 is effectively abutted against a top surface of the lower portion of the rod holder 23 in such a manner that the lower portion of the rod holder 23 is statically held between the coupling nut 28 and the distal end of the cylinder 27 during operating conditions. The selectively adjusting mechanism further includes an air hose with a first end directly connected to the proximal end of the cylinder 27 and a second end extending away therefrom, and a tee union adapter 29 directly connected to the second end of the air hose 50. Such a tee union adapter 29 advantageously connects the air hose 50 to an existing air supply source. The air cylinder 27 is activated by the same air solenoid that supplies the pinch valve.

Referring again to FIGS. 1-8, the support arm further includes a mechanism for selectively adjusting the rod along a first bi-directional linear path when an existing air pinch valve of an existing milking system is activated such that the rod drops below an existing curb. Such a selectively adjusting mechanism 26 is directly engaged with the rod 21 and the rod holder 23 during operating conditions. The selectively adjusting mechanism 26 effectively includes a cylinder 27 with a distal end directly coupled to a bottom surface of the lower portion of the rod holder 23. Such a cylinder 27 advantageously has a proximal end extending downwardly and away from the distal end of the cylinder 27. The distal end of the cylinder 27 is conveniently spaced from the middle portion of the rod holder 23 and the rod 21 respectively when the rod 21 is interfitted within the rod holder 23. The cylinder 27 further has a longitudinal length oriented parallel to the longitudinal length of the rod 21 during operating conditions which is critical such that a drive cam of the cylinder 27 travels along a second bi-directional linear path defined parallel to the first bi-directional linear path. The selectively adjusting mechanism provides a user the benefit of choosing the best position for the rod and thereby fixing the rod in such a position during milking procedures.

Referring again to FIGS. 1-8, the selectively adjusting mechanism further includes a coupling nut 28 threadably coupled to the distal end of the cylinder 27. Such a coupling nut 28 is effectively abutted against a top surface of the lower portion of the rod holder 23 in such a manner that the lower portion of the rod holder 23 is statically held between the coupling nut 28 and the distal end of the cylinder 27 during operating conditions. The selectively adjusting mechanism further includes an air hose with a first end directly connected to the proximal end of the cylinder 27 and a second end extending away therefrom, and a tee union adapter 29 directly connected to the second end of the air hose 30. Such a tee union adapter 29 advantageously connects the air hose 30 to an existing air supply source. The air cylinder 27 is activated by the same air solenoid that supplies the pinch valve.

Referring again to FIGS. 1-8, the selectively adjusting mechanism 26 further includes a flattened lever 30 with axially opposed left and right ends. The lever 30 is the most important part of the present invention for holding the rod 21 at the desired height. The lever 30 engages the rod in a combination of friction and gravity to hold the rod 21 at the desired height. The lever 30 engages on its own and can be released either manually or by admitting pressured air into the air cylinder 27. Such a left end of the lever 31 conveniently has a top surface oriented along a vertical plane while a medial portion of the lever and such a right end 32 of the lever has respective top surfaces oriented along a horizontal plane. The left end of the lever 31 is interfitted within the slot 25 of the middle portion of the rod holder 23. Such a middle portion of the lever 33 effectively has an opening 34 formed therein. Such an opening 34 is vertically aligned with the apertures 24 of the rod holder 23 and is positioned in such a manner that the rod 21 simultaneously penetrates the opening 34 and the apertures 24 respectively when the rod 21 is interfitted within the rod holder 23 during non-operating conditions. The right end of the lever has a lower surface spaced from the coupling nut 28 during non-lifting conditions. It is noted that the air cylinder 27 does not have any air pressure to it at the time of operating the hose support arm, and the air cylinder 27 and coupling nut 28 must not contact the underside of the lever 31 during operation. The coupling nut 28 adjusts the length of the rod 21 so that it will lift the lever 31 when engaged but will be free of all contact with the lever 31 when the hose arm rod 21 is to be adjusted to the correct position. Therefore, no contact is made between the lever 31 and cylinder 27 during non-lifting conditions.

Referring again to FIGS. 1-8, a predetermined oscillating air pressure level is introduced into the cylinder 27 from the existing air supply source to thereby raise and lower the coupling nut and articulate the lever about the rod to thereby adjust the position of the rod 21 and the rubber bumper 20 respectively during non-operating conditions. The predetermined oscillating air pressure level provides a user the benefit of automatically adjusting the air supply in order to ensure proper milking procedures.

Referring to FIGS. 1-4, the cluster hose support arm further includes a portable slide 35 with a longitudinal length oriented along a horizontal plane and with front and back sides respectively. Such a slide 35 conveniently has top and bottom edges registered parallel to the longitudinal length of the slide 35. Such top and bottom edges are effectively folded upwardly and inwardly towards the front side of the slide respectively and terminate proximal of a centrally registered axis of the slide. Such folds 36 of the top and bottom edges define a groove 37 therein. The portable slide allows a back plate to be positioned or removed from the slide as needed.

Referring to FIGS. 1-4, a planar back plate 38 has a lateral width that is less than a lateral width of the slide 35 and further has top and bottom surfaces respectively. Such a back plate 38 is slidably interfitted with the slide 35 such that the back plate 38 is linearly positioned along the entire longitudinal length of the slide 35 as desired by the user during operating conditions. The bottom surface of the back plate is effectively abutted directly against the front side of the slide 35. The top surface of the back plate 38 is monolithically formed with the rod holder 23 which is crucial such that the top surface of the back plate 38 is registered perpendicular to the respective longitudinal lengths of the rod 21 and the cylinder 27.

Referring to FIGS. 5-8, an alternate embodiment 10' of the cluster hose support arm further includes a substantially square-shaped and planar back plate 38' with front and back sides respectively. Such a back plate 38' is conveniently provided with one wall monolithically formed therewith and located along an outer edge of the back plate 38' and further is oriented at a right angle to the back plate. The front side 40 of the back plate 38' is monolithically formed with the rod holder 23 which is vital such that the front side 40 of the back plate 38' is registered perpendicular to the respective longitudinal lengths of the rod 21 and the cylinder 27. The rod holder 23 is located subjacent to and opposite of the one wall. The back plate allows a user to move the rod by detaching the back plate from the bracket.

Referring again to FIGS. 1-8, a substantially C-shaped angle bracket 41 has upper, middle, and lower portions respectively. Such an upper portion 42 is advantageously directly attached to the one wall 43. The upper, middle, and lower portions are collectively located subjacent to the one wall when the angle bracket is attached to the one wall. Such an angle bracket 41 is positioned in such a manner that an interior surface of the angle bracket faces toward the back side of the back plate 38' and thereby forms a passageway extending along entire longitudinal lengths of the angle bracket 41 and the one wall respectively. Such a passageway has an open face oriented downwardly and away from the one wall during operating conditions. The C-shaped bracket is an alternate embodiment that allows a user to attach the support arm to varying surfaces, according to a user's needs.

The rod provides the unexpected benefit of allowing a user to adjust the height of the rod according to the size of the cow. In addition, the predetermined oscillating air pressure level ensures a better quality milking procedure without any additional work by a user. The varying back plates allow a user to attach the support arm in various locations, as needed. Such benefits overcome the prior art shortcomings.

In use, a method for supporting an existing milking cluster hose where milking is done from a rear of a cow includes the steps of: providing a rubber bumper 20 for decreasing noise and wear when an air cylinder releases the lever and a rod (described hereinafter) drops down below the curb. Directly attaching a first end of a rectilinear rod 21 to the rubber bumper 20. Such a rectilinear rod 21 has a second end extending vertically and downwardly away from the rubber bumper 20. The steps further include directly connecting a rod holder 23 to the rod 21 in such a manner that the rod 21 is telescopically adjusted along a major longitudinal length thereof and selectively adjusting the rod 21 along a first bi-directional linear path when an existing air pinch valve of existing milking system is activated such that the rod 21 drops below an existing curb.

In use, the method further includes the step of directly coupling a distal end of a cylinder 27 to a bottom surface of the lower portion of the rod holder 23. Such a cylinder 27 has a proximal end extending downwardly and away from the distal end of the cylinder 27. Such a distal end of the cylinder 27 is spaced from a middle portion of the rod holder 23 and the rod 21 respectively when the rod 21 is interfitted within the rod holder 23. The cylinder 27 has a longitudinal length oriented parallel to the longitudinal length of the rod 21 during operating conditions such that a drive cam of the cylinder travels along a second bi-directional linear path defined parallel to the first bi-directional linear path.

In use, the method further includes the step of threadably attaching a coupling nut 28 to the distal end of the cylinder 27. Such a coupling nut 28 is abutted against a top surface of the lower portion of the rod holder 23 in such a manner that the lower portion of the rod holder 23 is statically held between the coupling nut 28 and the distal end of the cylinder 27 during operating conditions. The steps further include: directly connecting a first end of an air hose to the proximal end of the cylinder 27 and a second end extending away therefrom; directly connecting a tee union adapter 29 to the second end of the air hose 50, the tee union adapter 29 connecting the air hose 50 to an existing air supply source; and connecting a flattened lever to the rod holder 23.

Such a lever 30 has axially opposed left and right ends. The left end of the lever 31 has a top surface oriented along a vertical plane while a medial portion of the lever and the right end of the lever 32 have respective top surfaces oriented along a horizontal plane. The left end of the lever 31 is interfitted within the slot 25 of the middle portion of the rod holder 23, and the medial portion of the lever 33 has an opening 34 formed therein. Such an opening 34 is vertically aligned with the apertures 24 of the rod holder 23 and is positioned in such a manner that the rod 21 simultaneously penetrates the opening 34 and the apertures 24 respectively when the rod 21 is interfitted within the rod holder 23 during operating conditions. The right end of the lever has a lower surface spaced from the coupling nut 28 during non-lifting conditions. Another step includes introducing a predetermined oscillating air pressure level into the cylinder from the existing air supply source and thereby raising and lowering the coupling nut 28 and articulating the lever 30 about the rod 21 to adjust the position of the rod 21 and the rubber bumper 20 respectively during non-operating conditions. The lever 30 is the most important part of the present invention for holding the rod 21 at the desired height. The lever 30 engages the rod 21 in a combination of friction and gravity to hold the rod 21 at the desired height. The lever 30 engages on its own and can be released either manually or by admitting pressured air into the air cylinder 27.

In use, the method further includes the step of providing a portable slide 35 with a longitudinal length oriented along a horizontal plane and further has front and back sides respectively. Such a slide 35 has top and bottom edges registered parallel to the longitudinal length of the slide 35. Such top and bottom edges are folded upwardly and inwardly towards the front side of the slide respectively and terminate proximal of a centrally registered axis of the slide. Such folds 36 of the top and bottom edges define a groove 37 therein.

In use, the steps further include providing a planar back plate 38 with a lateral width that is less than a lateral width of the slide 35 and further has top and bottom surfaces respectively. Such a back plate 38 is slidably interfitted with the slide 35 such that the back plate 38 is linearly positional along the entire longitudinal length of the slide 35 as desired by the user during operating conditions. The bottom surface of the back plate 38 is abutted directly against the front side of the slide. The top surface of the back plate 38 is monolithically formed with the rod holder 23 such that the top surface of the back plate 38 is registered perpendicular to the respective longitudinal lengths of the rod 21 and the cylinder 27.

In use of an alternate embodiment of the support arm, the method further includes the step of providing a substantially square-shaped and planar back plate 38' with front and back sides respectively. Such a back plate 38' is provided with one wall monolithically formed therewith and located along an outer edge of the back plate 38' and further is oriented at a right angle to the back plate. The front side of the back plate is monolithically formed with the rod holder such that the front side 40 of the back plate 38' is registered perpendicular to the respective longitudinal lengths of the rod 21 and the cylinder 27. The rod holder 23 is located subjacent to and opposite of the one wall.

In use, the method for an alternate embodiment of the present invention further includes the step of providing a substantially C-shaped angle bracket 41 with upper, middle, and lower portions respectively. Such an upper portion 42 is directly attached to the one wall 43. The upper, middle, and lower portions are collectively located subjacent to the one wall when the angle bracket is attached to the one wall. Such an angle bracket 41 is positioned in such a manner that an interior surface of the angle bracket faces toward the back side of the back plate and thereby forms a passageway extending along entire longitudinal lengths of the angle bracket and the one wall respectively. Such a passageway has an open face oriented downwardly and away from the one wall during operating conditions.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A rear milking cluster hose support arm for supporting a milking cluster hose in an existing milking system where milking is done from a rear of a cow, said cluster hose support arm comprising:
    a rubber bumper;
    a rectilinear rod having a first end directly attached to said rubber bumper and further having a second end extending vertically and downwardly away from said rubber bumper;
    a rod holder directly connected to said rod;
    means for selectively adjusting said rod along a first bi-directional linear path when an existing air pinch valve of an existing milking system is activated;
    wherein said rod has a plurality of monolithically formed planar outer surfaces;
    wherein said rod holder has a plurality of vertically aligned apertures formed in upper and lower portions thereof respectively, said apertures being sized and shaped such that said rod is interfitted within said apertures during operating conditions, each of said apertures having a centrally registered and vertically oriented axis positioned in such a manner that said rod simultaneously penetrates each of said apertures when said rod is interfitted within said rod holder, said rod holder further having a vertically oriented slot formed in a middle portion thereof;
    wherein said selectively adjusting means comprises:
    a cylinder having a distal end directly coupled to a bottom surface of said lower portion of said rod holder, said cylinder having a proximal end extending downwardly and away from said distal end of said cylinder, said distal end of said cylinder being spaced from said middle portion of said rod holder and said rod respectively when said rod is interfitted within said rod holder, said cylinder having a longitudinal length oriented parallel to said longitudinal length of said rod during operating conditions such that a drive cam of said cylinder travels along a second bi-directional linear path defined parallel to said first bi-directional linear path;
    a coupling nut threadably coupled to said distal end of said cylinder, said coupling nut being abutted against a top surface of said lower portion of said rod holder in such a manner that said lower portion of said rod holder is statically held between said coupling nut and said distal end of said cylinder during operating conditions;
    an air hose having a first end directly connected to said proximal end of said cylinder and a second end extending away therefrom;
    a tee union adapter directly connected to said second end of said air hose, said tee union adapter connecting said air hose to an existing air supply source; and
    a flattened lever having axially opposed left and right ends, said left end of said lever having a top surface oriented along a vertical plane while a medial portion of said lever and said right end of said lever have respective top surfaces oriented along a horizontal plane, said left end of said lever being interfitted within said slot of said middle portion of said rod holder, said medial portion of said lever having an opening formed therein, said opening being vertically aligned with said apertures of said rod holder, said opening being positioned in such a manner that said rod simultaneously penetrates said opening and said apertures respectively when said rod is interfitted within said rod holder during operating conditions, said right end of said lever having a lower surface contacting said coupling nut during non-operating conditions and spaced from said coupling nut during operating conditions;
    wherein a predetermined oscillating air pressure level is introduced into said cylinder from the existing air supply source to thereby raise and lower said coupling nut and articulate said lever about said rod to thereby adjust the position of said rod and said rubber bumper respectively during non-operating conditions.

2. The cluster hose support arm of claim 1, further comprising:
    a portable slide having a longitudinal length oriented along a horizontal plane and further having front and back sides respectively, said slide having top and bottom edges registered parallel to said longitudinal length of said slide, each of said top and bottom edges being folded upwardly and inwardly towards said front side of said slide respectively, said top and bottom edges terminating proximal of a centrally registered axis of said slide, each of said folds of said top and bottom edges defining a groove therein; and
    a planar back plate having a lateral width that is less than a lateral width of said slide and further having top and bottom surfaces respectively, said back plate being slidably interfitted along said slide such that said back plate is linearly positioned along said entire longitudinal length of said slide as desired by the user during operating conditions, said bottom surface of said back plate being abutted directly against said front side of said slide, said top surface of said back plate being monolithically formed with said rod holder such that said top surface of said back plate is registered perpendicular to said respective longitudinal lengths of said rod and said cylinder.

3. The cluster hose support arm of claim 1, further comprising:
    a substantially square-shaped and planar back plate having front and back sides respectively, said back plate being provided with one wall monolithically formed therewith and located along an outer edge of said back plate and further being oriented at a right angle to said back plate, said front side of said back plate being monolithically formed with said rod holder such that said front side of said back plate is registered perpendicular to said respective longitudinal lengths of said rod and said cylinder, said rod holder being located subjacent to and opposite of said one wall; and a substantially C-shaped angle bracket having upper, middle, and lower portions respectively, said upper portion being directly attached to said one wall, said upper, middle, and lower portions being collectively located subjacent to said one wall when said angle bracket is attached to said one wall, said angle bracket being positioned in such a manner that an interior surface of said angle bracket faces toward said back side of said back plate and thereby forms a passageway extending along entire longitudinal lengths of said angle bracket and said one wall respectively, said passageway having an open face oriented downwardly and away from said one wall during operating conditions.

4. A rear milking cluster hose support arm for supporting a milking cluster hose in an existing milking system where milking is done from a rear of a cow, said cluster hose support arm comprising:

a rubber bumper;

a rectilinear rod having a first end directly attached to said rubber bumper and further having a second end extending vertically and downwardly away from said rubber bumper;

a rod holder directly connected to said rod;

means for selectively adjusting said rod along a first bi-directional linear path when an existing air pinch valve of an existing milking system is activated, wherein said selectively adjusting means is spaced from said rod and said rod holder during operating conditions;

wherein said rod holder has a plurality of vertically aligned apertures formed in upper and lower portions thereof respectively, said apertures being sized and shaped such that said rod is interfitted within said apertures during operating conditions, each of said apertures having a centrally registered and vertically oriented axis positioned in such a manner that said rod simultaneously penetrates each of said apertures when said rod is interfitted within said rod holder, said rod holder further having a vertically oriented slot formed in a middle portion thereof;

wherein said selectively adjusting means comprises:

a cylinder having a distal end directly coupled to a bottom surface of said lower portion of said rod holder, said cylinder having a proximal end extending downwardly and away from said distal end of said cylinder, said distal end of said cylinder being spaced from said middle portion of said rod holder and said rod respectively when said rod is interfitted within said rod holder, said cylinder having a longitudinal length oriented parallel to said longitudinal length of said rod during operating conditions such that a drive cam of said cylinder travels along a second bi-directional linear path defined parallel to said first bi-directional linear path;

a coupling nut threadably coupled to said distal end of said cylinder, said coupling nut being abutted against a top surface of said lower portion of said rod holder in such a manner that said lower portion of said rod holder is statically held between said coupling nut and said distal end of said cylinder during operating conditions;

an air hose having a first end directly connected to said proximal end of said cylinder and a second end extending away therefrom;

a tee union adapter directly connected to said second end of said air hose, said tee union adapter connecting said air hose to an existing air supply source; and a flattened lever having axially opposed left and right ends, said left end of said lever having a top surface oriented along a vertical plane while a medial portion of said lever and said right end of said lever have respective top surfaces oriented along a horizontal plane, said left end of said lever being interfitted within said slot of said middle portion of said rod holder, said medial portion of said lever having an opening formed therein, said opening being vertically aligned with said apertures of said rod holder, said opening being positioned in such a manner that said rod simultaneously penetrates said opening and said apertures respectively when said rod is interfitted within said rod holder during operating conditions, said right end of said lever having a lower surface contacting said coupling nut during lifting conditions and spaced from said coupling nut during non-lifting conditions;

wherein a predetermined oscillating air pressure level is introduced into said cylinder from the existing air supply source to thereby raise and lower said coupling nut and articulate said lever about said rod to thereby adjust the position of said rod and said rubber bumper respectively during non-operating conditions.

5. The cluster hose support arm of claim 4, further comprising:

a portable slide having a longitudinal length oriented along a horizontal plane and further having front and back sides respectively, said slide having top and bottom edges registered parallel to said longitudinal length of said slide, each of said top and bottom edges being folded upwardly and inwardly towards said front side of said slide respectively, said top and bottom edges terminating proximal of a centrally registered axis of said slide, each of said folds of said top and bottom edges defining a groove therein; and a planar back plate having a lateral width that is less than a lateral width of said slide and further having top and bottom surfaces respectively, said back plate being slidably interfitted with said slide such that said back plate is linearly positioned along said entire longitudinal length of said slide as desired by the user during operating conditions, said bottom surface of said back plate being abutted directly against said front side of said slide, said top surface of said back plate being monolithically formed with said rod holder such that said top surface of said back plate is registered perpendicular to said respective longitudinal lengths of said rod and said cylinder.

6. The cluster hose support arm of claim 4, further comprising:

a substantially square-shaped and planar back plate having front and back sides respectively, said back plate being provided with one wall monolithically formed therewith and located along an outer edge of said back plate and further being oriented at a right angle to said back plate, said front side of said back plate being monolithically formed with said rod holder such that said front side of said back plate is registered perpendicular to said respective longitudinal lengths of said rod and said cylinder, said rod holder being located subjacent to and opposite of said one wall; and a substantially C-shaped angle bracket having upper, middle, and lower portions respectively, said upper portion being directly attached to said one wall, said upper, middle, and lower portions being collectively located subjacent to said one wall when said angle bracket is attached to said one wall, said angle bracket being positioned in such a manner that an interior surface of said angle bracket faces toward said back side of said back plate and thereby forms a passageway extending along entire longitudinal lengths of said angle bracket and said one wall respectively, said passageway having an open face oriented downwardly and away from said one wall during operating conditions.

7. A method for supporting an existing milking cluster hose where milking is done from a rear of a cow, said method comprising the steps of:
   a. providing a rubber bumper;
   b. directly attaching a first end of a rectilinear rod to said rubber bumper, said rectilinear rod having a second end extending vertically and downwardly away from said rubber bumper;
   c. directly connecting a rod holder to said rod;
   d. selectively adjusting said rod along a first bi-directional linear path when an existing air pinch valve of existing milking system is activated
   wherein said rod holder has a plurality of vertically aligned apertures formed in upper and lower portions thereof respectively, said apertures being sized and shaped such that said rod is interfitted within said apertures during operating conditions, each of said apertures having a centrally registered and vertically oriented axis positioned in such a manner that said rod simultaneously penetrates each of said apertures when said rod is interfitted within said rod holder, said rod holder further having a vertically oriented slot formed in said middle portion thereof;
   wherein said step d. comprises the steps of:
     i. directly coupling a distal end of a cylinder to a bottom surface of said lower portion of said rod holder, said cylinder having a proximal end extending downwardly and away from said distal end of said cylinder, said distal end of said cylinder being spaced form a middle portion of said rod holder and said rod respectively when said rod is interfitted within said rod holder, said cylinder having a longitudinal length oriented parallel to said longitudinal length of said rod during operating conditions such that a drive cam of said cylinder travels along a second bi-directional linear path defined parallel to said first bi-directional linear path;
     ii. threadably attaching a coupling nut to said distal end of said cylinder, said coupling nut being abutted against a top surface of said lower portion of said rod holder in such a manner that said lower portion of said rod holder is statically held between said coupling nut and said distal end of said cylinder during non-operating conditions;
     iii. directly connecting a first end of an air hose to said proximal end of said cylinder and a second end extending away therefrom;
     iv. directly connecting a tee union adapter to said second end of said air hose, said tee union adapter connecting said air hose to an existing air supply source;
     v. connecting a flattened lever to said rod holder, said lever having axially opposed left and right ends, said left end of said lever having a top surface oriented along a vertical plane while a medial portion of said lever and said right end of said lever have respective top surfaces oriented along a horizontal plane, said left end of said lever being interfitted within said slot of said middle portion of said rod holder, said medial portion of said lever having an opening formed therein, said opening being vertically aligned with said apertures of said rod holder, said opening being positioned in such a manner that said rod simultaneously penetrates said opening and said apertures respectively when said rod is interfitted within said rod holder during operating conditions, said right end of said lever having a lower surface contacting said coupling nut during non-operating conditions and spaced from said coupling nut during operating conditions; and
     vi. introducing a predetermined oscillating air pressure level into said cylinder from the existing air supply source and thereby raising and lowering said coupling nut and articulating said lever about said rod to adjust the position of said rod and said rubber bumper respectively during non-operating conditions.

8. The method of claim 7, further comprising the steps of:
   e. providing a portable slide having a longitudinal length oriented along a horizontal plane and further having front and back sides respectively, said slide having top and bottom edges registered parallel to said longitudinal length of said slide, each of said top and bottom edges being folded upwardly and inwardly towards said front side of said slide respectively, said top and bottom edges terminating proximal of a centrally registered axis of said slide, each of said folds of said top and bottom edges defining a groove therein; and
   f. providing a planar back plate having a lateral width that is less than a lateral width of said slide and further having top and bottom surfaces respectively, said back plate being slidably interfitted with said slide such that said back plate is linearly positional along said entire longitudinal length of said slide as desired by the user during operating conditions, said bottom surface of said back plate being abutted directly against said front side of said slide, said top surface of said back plate being monolithically formed with said rod holder such that said top surface of said back plate is registered perpendicular to said respective longitudinal lengths of said rod and said cylinder.

9. The method of claim 7, further comprising the steps of:
   e. providing a substantially square-shaped and planar back plate having front and back sides respectively, said back plate being provided with one wall monolithically formed therewith and located along an outer edge of said back plate and further being oriented at a right angle to said back plate, said front side of said back plate being monolithically formed with said rod holder such that said front side of said back plate is registered perpendicular to said respective longitudinal lengths of said rod and said cylinder, said rod holder being located subjacent to and opposite of said one wall; and
   f. providing a substantially C-shaped angle bracket having upper, middle, and lower portions respectively, said upper portion being directly attached to said one wall, said upper, middle, and lower portions being collectively located subjacent to said one wall when said angle bracket is attached to said one wall, said angle bracket being positioned in such a manner that an interior surface of said angle bracket faces toward said back side of said back plate and thereby forms a passageway extending along entire longitudinal lengths of said angle bracket and said one wall respectively, said passageway having an open face oriented downwardly and away from said one wall during operating conditions.

* * * * *